United States Patent [19]

Eadie et al.

[11] 4,006,734

[45] Feb. 8, 1977

[54] STORAGE HEATER BRICKS

[75] Inventors: Gordon Cunningham Eadie, Wentwood, near Usk; Christopher Frederick Hinsley, Newport, both of Wales

[73] Assignee: British Steel Corporation, London, England

[22] Filed: Nov. 26, 1974

[21] Appl. No.: 527,437

[52] U.S. Cl. .............................. 126/400; 252/70; 423/594; 219/365; 219/378; 219/530; 165/104 M

[51] Int. Cl.² .................. F24H 7/00; C09K 53/00

[58] Field of Search ............ 423/594; 428/538; 252/70; 126/400; 219/365, 378, 530; 165/104 M

[56] References Cited

UNITED STATES PATENTS

| | | | |
|---|---|---|---|
| 3,027,327 | 3/1962 | Blank | 423/594 |
| 3,043,654 | 7/1962 | Brixner | 423/594 |
| 3,113,109 | 12/1963 | Brixner | 423/594 |
| 3,428,416 | 2/1969 | Gie et al. | 423/594 |
| 3,519,386 | 7/1970 | Fedock et al. | 423/594 |
| 3,751,366 | 8/1973 | Bomer et al. | 423/594 |
| 3,773,031 | 11/1973 | Laing et al. | 126/400 |
| 3,958,101 | 5/1976 | Barabas | 126/400 |

OTHER PUBLICATIONS

Eadie, Chemical Abstracts, vol. 76, 78566c, 1972.
Ecles, "Ferrio–Oxide Cores Cut Electric Heat Storage Costs," Design Eng. Meter Components, Nov., 1970.

*Primary Examiner*—Thomas J. Herbert, Jr.
*Assistant Examiner*—John D. Smith
*Attorney, Agent, or Firm*—Brisebois & Kruger

[57] ABSTRACT

Heat storage medium is produced by heating a mix of ferric oxide and an additive comprising a calcium compound to a temperature at which the additive reacts with the ferric oxide to improve its volumetric heat capacity, reducing the reaction product to particulate form, compacting the resulting particles, and sintering the compact.

13 Claims, No Drawings

STORAGE HEATER BRICKS

This invention relates to heat storage media and is particularly though not exclusively concerned with heat storage media for use in electrical storage heaters. Such heaters include a heat storage medium, in suitable form such as in bricks, which is adapted to be heated by a resistive heating element using current supplied at specific low cost 'off peak' periods and subsequently to release stored heat at a selected rate and over a different period.

To be suitable for use in such electrical storage heaters in particular, a heat storage medium should meet certain criteria. It should for example have a high volumetric thermal capacity to keep the size of the storage heater as low as possible, and should have sufficient mechanical strength and to support compression loads created by superimposed heat storage material. A high electrical resistivity also is desirable to reduce strain on the electrical insulation provided on the resistive heating elements, particularly at the high operating temperatures involved. A high resistance to thermal shock and to corrosion at high temperatures also is a property sought in an ideal medium.

It has been proposed to employ ferric oxide ($Fe_2O_3$) as a heat storage medium, particularly for use in electrical storage heaters. In practice, the ferric oxide has been directly compressed, with or without applied heat, into the form required in the heater, for example, into bricks shaped to accommodate heating elements in a suitable spaced array. However, while such bricks provide an acceptable thermal capacity and corrosion resistance they do display a relatively high electrical conductivity which requires extensive electrical insulation on the heating elements to give reliable long term operation at the high temperatures involved. Ferric oxide alone also suffers from considerable and unpredictable shrinkage during firing and presents considerable difficulties in producing bricks of the high dimensional tolerance required to ensure good heat transfer with heating elements of standard size.

It is an object of the present invention to provide a heat storage medium which combines the advantages of ferric oxide while avoiding at least to some extent the disadvantages of this material.

According to one aspect of the present invention a process for producing a heat storage medium comprises heating a mix of ferric oxide and an additive comprising a suitable compound of calcium at an elevated temperature effective to react the additive with the ferric oxide to improve volumetric heat capacity, reducing the reaction product to particulate form compacting the particles and sintering the compact.

A suitable calcium compound is an oxide of calcium or one capable of yielding the oxide at the elevated temperature.

The actual additive used is conveniently selected to improve the electrical resistivity of the medium, compared with that of ferric oxide alone in addition to improving the volumetric heat capacity. While additive may in one embodiment be deliberately added to the ferric oxide, it may already be present as a constituent.

In a preferred embodiment of the invention the additive comprises substantially only a suitable compound of calcium except for incidental impurities which may vary with the material source. A suitable compound here is calcium carbonate which may typically include magnesium hydroxide, in addition to magnesium carbonate and calcium hydroxide.

It has been found that within limits the volumetric heat capacity of a medium produced by reacting ferric oxide at the elevated temperature with the selected additive increases as the quantity of additive increases. Thus while the actual ferric oxide-additive mix ratio selected depends upon the compound of calcium used and is determined from previous trials, a mole ratio ferric oxide to additive of at least 1:1 and ideally within the range 1:1 to 3:1 has been found to produce acceptable values of volumetric heat capacity.

Specifically, the mole ratio of ferric oxide to the calcium oxide residue of the additive, should lie between 0.6:1 and 3.9:1.

In addition to a compound of calcium, the mix may however also include an additive comprising a suitable compound of Barium (Ba) or of Strontium (Sr) or of lead (Pb), for example barium carbonate, strontium carbonate or lead carbonate respectively. The mix may also include a suitable compound of magnesium, zinc, or samarium, for example magnesium oxide (MgO), zinc, and displays the general characteristics of a ceramic, that is to say it can be shaped when in a moist condition and is refractory after a firing. It is also chemically inert.

In general, such ceramic heat storage media display a higher volumetric thermal capacity than the media of the ferrite type.

After firing the ferrite, ceramic or refractory heat storage medium is optionally ground to a particle size enabling the particles when moistened to be shaped to the required final form, for example bricks, for subsequent use. The bricks may then be sintered to fuse the particles into the final form.

Conveniently, the additive is in the form of a flux which facilitates sintering and may include calcium oxide or aluminium oxide as a filler.

The storage medium may also include evenly distributed inert metal particles such as aluminum flakes or other particles of high thermal conductivity in order to improve transfer of heat from the core of the medium to the surrounding ambient.

Embodiments of the invention will now be particularly described by way of example:

EXAMPLE 1

Finely divided iron oxide, typically $Fe_2O_3$ obtained as a by-product from a hydrochloric acid etch recovery plant and having an average analysis set forth in table 1 below was intimately mixed in a ratio characteristically of 5:1 by weight with finely divided strontium carbonate of standard commercial quality.

Table 1

| | |
|---|---|
| FeO | 5.93% |
| $Fe_2O_3$ | 89.8 |
| $SiO_2$ | 0.08 |
| $Al_2O_3$ | 0.04 |
| CaO | 0.40 |
| MgO | 0.11 |
| S | 0.10 |
| P | 0.009 |
| Mn | 0.26 |

The mixture was fired in open trays for about forty-five minutes at some 1070° C to produce reaction between the ferric oxide and the strontium carbonate, before being allowed to cool to room temperature.

The resulting medium was wet ground for about eight hours to reduce it to finely divided form suspended as a slurry in water. After removal of the bulk of the water, by any conventional means, the medium now having the consistency of wet clay was pressed in a mould to the form required. In this embodiment, the medium was pressed at about 450 bars to a compact, in the form of a brick, which was slowly dried to avoid cracking and subsequently sintered in air at 1300° C for 30 minutes. Both heating and cooling rates were graduated to avoid cracking due to thermally induced mechanical induced mechanical strain. The heat storage medium so produced displayed a volumetric thermal capacity of 2800 kilojoules per liter measured by a calorimetric method.

EXAMPLE 2

Finely divided ferric oxide as in Example 1 is, in this case, intimately mixed with barium carbonate again in a mix ratio of 5:1 by weight. The mixture is fired at some 1000° C for about 20 minutes to produce a medium, which is subsequently processed to form heat storage bricks by a method similar to that of example 1 also. The volumetric heat capacity of bricks made according to this embodiment was 1650 kilojoules per liter.

EXAMPLE 3

Finely divided ferric oxide as in Example 1 was intimately mixed in a 1:1 weight ratio with calcium carbonate of laboratory quality in finely divided form. The resulting mixture is fired at 1000 C for 20 minutes to produce a medium which was bricketted as in previous examples and sintered at a temperature of about 1200° C. The volumetric heat capacity of the medium so produced was 2700 kilojoules per liter.

EXAMPLE 4

Finely divided ferric oxide as in Example 3 was intimately mixed with calcium carbonate and having typical analysis set forth in Table 2 below:

Table 2

| | |
|---|---|
| $CaCO_3$ | 81.1% |
| $Mg(OH)_2$ | 10.2 |
| $MgCO_3$ | 2.2 |
| $Fe(OH)_2$ | 0.6 |
| $Ca(OH)_2 + Al$ | 5.9 |

The ferric oxide and calcium carbonate were intimately mixed in a weight ratio of 6:1 and fired at a temperature of about 1200° C for some 20 minutes. The medium produced was bricketted as in Example 1 and sintered at 1300° C for about 5 minutes. A volumetric thermal capacity of about 4000 kilojoules per liter was displayed by heat storage produced by this embodiment. It is believed that the improvement in thermal capacity over that of Example 3 results from incidental impurities in the calcium carbonate.

While in the foregoing examples the additive to the ferric oxide comprises the carbonate of calcium only, the carbonates of one or more metals may be used. In the case where the carbonates of two or more metals are used, the firing products of examples 1 or 2 may alternatively be reduced to finely divided forms by grinding and mixing in suitable combination prior to bricketting and final sintering.

By way of example, the end products of examples 1 and 2 were ground and intimately mixed in a 1:1 weight ratio prior to pressing at 470 bars and final sintering at 1300° C for 30 minutes in air. The final medium displayed a volumetric thermal capacity of 3050 kilojoules per liter.

In all the foregoing examples, suitable binders together with metal or other particles of relatively high thermal conductivity may be added.

It will be appreciated that while specific combinations of temperature and time have been quoted for the firing and sintering operations described, both temperatures and time may be varied to produce optimum volumetric thermal capacity where the medium constituents have different analyses or are used in different ratios.

The heat insulation media produced according to the present invention possess certain advantages such as high electrical resistance and robustness compared with the use of ferric oxide alone and can be used to produce bricks of high volumetric heat capacity with values approaching or in some cases exceeding that of ferric oxide alone.

The present invention also is intended to include within its scope, heat storage bricks or other heat storage elements made from the medium; in the case of bricks these conveniently include grooves so that adjacent bricks form channels for receiving suitable heating elements.

Since the heat storage media of the invention also display a high resilience in excess of 3-6 megohns at room temperature, the insulation on the heating elements is not critical and can be designated to produce considerable cost savings.

What we claim is:

1. A process for producing a heat storage medium which comprises the steps of heating a mix of ferric oxide and an additive including a calcium oxide or a compound capable of yielding a calcium oxide at an elevated temperature effective to react the additive with the ferric oxide to improve its volumetric heat capacity with the mole ratio of the ferric oxide to the calcium oxide residue of said additive lying within the range 0.6:1 to 3.9:1, reducing the reaction product to particles, compacting the particles, and sintering the compacted particles.

2. A process as claimed in claim 1 wherein the additive is calcium oxide or a compound capable of yielding calcium oxide at the elevated temperature.

3. A process as claimed in claim 2 wherein the additive is calcium carbonate.

4. A process claimed in claim 1 wherein the additive includes a suitable compound of one or more of magnesium, strontium, barium or lead.

5. A process as claimed in claim 1 wherein the additive is substantially wholly of a compound of calcium.

6. A process as claimed in claim 1 wherein the additive is constituted to act as a flux at the elevated temperature.

7. A process as claimed in claim 1 wherein particles of high thermal conductivity material are incorporated in the medium.

8. A process as claimed in claim 7 wherein the particles are of aluminium.

9. A process as claimed in claim 1 wherein the elevated temperature effective to produce the ferric oxide-activator reaction is selected to lie within the range 1000° to 1200° C.

10. A process as claimed in claim 1 wherein the particulate reaction product is compacted at about 450 bars before sintering.

11. A process as claimed in claim 1 wherein the compacted material is sintered at a temperature within a range of 1200° to 1300° C.

12. A heat storage medium produced by the process of claim 1.

13. A storage heater including a heat storage medium as claimed in claim 12.

* * * * *